US012584044B2

(12) United States Patent
Hino et al.

(10) Patent No.: US 12,584,044 B2
(45) Date of Patent: Mar. 24, 2026

(54) RELEASE CONTROL AGENT, RELEASABLE FILM-FORMING SILICONE COMPOSITION, AND RELEASE LINER

(71) Applicant: DOW TORAY CO., LTD., Tokyo (JP)

(72) Inventors: Takakazu Hino, Ichihara (JP); Syuji Endo, Ichihara (JP); Kazuhiro Nishijima, Ichihara (JP)

(73) Assignee: DOW TORAY CO., LTD., Shinagawa-ku (JP)

( * ) Notice: Subject to any disclaimer, the term of this patent is extended or adjusted under 35 U.S.C. 154(b) by 448 days.

(21) Appl. No.: 18/035,250

(22) PCT Filed: Nov. 11, 2021

(86) PCT No.: PCT/JP2021/041455
§ 371 (c)(1),
(2) Date: May 3, 2023

(87) PCT Pub. No.: WO2022/102688
PCT Pub. Date: May 19, 2022

(65) Prior Publication Data
US 2023/0407145 A1 Dec. 21, 2023

(30) Foreign Application Priority Data

Nov. 11, 2020 (JP) ................................. 2020-187851

(51) Int. Cl.
*C09J 7/40* (2018.01)
(52) U.S. Cl.
CPC ......... *C09J 7/401* (2018.01); *C09J 2483/005* (2013.01)
(58) Field of Classification Search
None
See application file for complete search history.

(56) References Cited

U.S. PATENT DOCUMENTS 5,468,828 A 11/1995 Hurford et al.
5,696,211 A 12/1997 Chung et al.
(Continued)

FOREIGN PATENT DOCUMENTS

EP 0108208 A2 5/1984
JP S5984953 A 5/1984
(Continued)

OTHER PUBLICATIONS

English translation of International Search Report for PCT/JP2021/041455 dated Jan. 11, 2022, 2 pages.
(Continued)

*Primary Examiner* — Jeffrey D Washville
(74) *Attorney, Agent, or Firm* — Warner Norcross + Judd LLP

(57) ABSTRACT

Provided is a release control agent containing a silicone resin having a weight average molecular weight based on standard polystyrene by gel permeation chromatography of 3,000 to 6,000 and expressed by the average unit formula: $(R^1_3SiO_{1/2})_a(SiO_{4/2})_{1.0}$, wherein each $R^1$ independently represents an alkyl group with 1 to 6 carbon atoms, and "a" represents a number from 0.5 to 1.5, and (B) a diorganopolysiloxane having at least two silicon-bonded alkenyl groups in a molecule and/or (C) an α-olefin with 12 to 24 carbon atoms. Also provided is a releasable film-forming silicone composition containing the release control agent. The releasable film-forming silicone composition forms a releasable film with little change in release force and that does not reduce the residual adhesive strength of a pressure sensitive adhesive (PSA) after long-term aging in a state adhered to the PSA despite exhibiting a relatively large release force with respect to the PSA.

11 Claims, 1 Drawing Sheet

(56) References Cited

U.S. PATENT DOCUMENTS

| | | | |
|---|---|---|---|
| 6,124,419 A * | 9/2000 | Armstrong | C08L 83/04 524/588 |
| 2007/0087207 A1 | 4/2007 | Irifune | |
| 2011/0287267 A1 | 11/2011 | Hori et al. | |
| 2015/0119518 A1 | 4/2015 | Yamamoto et al. | |
| 2015/0133594 A1 | 5/2015 | Ihara et al. | |
| 2017/0190939 A1 | 7/2017 | Hori et al. | |
| 2019/0382596 A1 | 12/2019 | Nakayama et al. | |

FOREIGN PATENT DOCUMENTS

| | | |
|---|---|---|
| JP | H01215857 A | 8/1989 |
| JP | H07216307 A | 8/1995 |
| JP | H07252360 A | 10/1995 |
| JP | H09278893 A | 10/1997 |
| JP | H10338845 A | 12/1998 |
| JP | 2003261855 A | 9/2003 |
| JP | 2007106908 A | 4/2007 |
| JP | 2010150537 A | 7/2010 |
| JP | 2013245274 A | 12/2013 |
| JP | 2013245279 A | 12/2013 |
| JP | 2018083913 A | 5/2018 |
| JP | 2018119056 A | 8/2018 |
| JP | 2020084042 A | 6/2020 |
| WO | 2016006252 A1 | 1/2016 |

OTHER PUBLICATIONS

Machine assisted English translation of JPH01215857A obtained from https://worldwide.espacenet.com/patent on Jul. 25, 2023, 6 pages.
Machine assisted English translation of JP2003261855A obtained from https://worldwide.espacenet. com/patent on Jul. 25, 2023, 9 pages.
Machine assisted English translation of JP2018083913A obtained from https://worldwide.espacenet.com/patent on Jul. 25, 2023, 13 pages.
Machine assisted English translation of JP2020084042A obtained from https://worldwide.espacenet.com/patent on Jul. 25, 2023, 9 pages.
Machine assisted English translation of JPH10338845A obtained from https://worldwide.espacenet.com/patent on Jul. 25, 2023, 16 pages.
Machine assisted English translation of JPH07216307A obtained from https://worldwide.espacenet.com/patent on Jul. 25, 2023, 11 pages.

* cited by examiner

RELEASE CONTROL AGENT, RELEASABLE FILM-FORMING SILICONE COMPOSITION, AND RELEASE LINER

CROSS-REFERENCE TO RELATED APPLICATIONS

This application is the U.S. National Stage of PCT/JP2021/041455 filed on 11 Nov. 2021, which claims priority to and all advantages of Japanese Patent Application No. 2020-187851 filed on 11 Nov. 2020, the content of which is incorporated herein by reference.

TECHNICAL FIELD

The present invention relates to a release control agent, a releasable film-forming silicone composition containing the agent, and a release liner obtained by forming a releasable film using the composition.

BACKGROUND ART

Releasable film-forming silicone compositions can be applied to surfaces of various base materials, such as paper, synthetic resin film, and the like, and then cured to form a film that exhibits releasability with respect to a pressure sensitive adhesive. The releasable film is required to have a constant release force when the pressure sensitive adhesive is peeled off, and to have no decrease in a residual pressure sensitive adhesive strength even after the pressure sensitive adhesive has been adhered for a long period of time.

On the other hand, a silicone resin is generally blended as a release control agent in order to achieve high-strength peeling (large force required for release) in the releasable film by the pressure sensitive adhesive. For example, Patent Document 1 proposes blending a silicone resin containing $R_3SiO_{1/2}$ units (R represents mutually identical or different monovalent hydrocarbon groups having two or fewer carbon atoms) and $SiO_{4/2}$ units with a curable silicone composition containing a diorganopolysiloxane that contains alkenyl groups, a methylhydrogenpolysiloxane having silicon atom-bonded hydrogen atoms, and a hydrosilylation-reaction catalyst along with, if necessary, a reactive diluent selected from the group consisting of dibutyl maleate, decyl vinyl ether, dodecyl vinyl ether, camphene, $C_{16-18}$ α-olefin, and m-bisisopropenylbenzene. Furthermore, Patent Document 2 proposes a releasable film-forming silicone composition containing: a diorganopolysiloxane having at least two alkenyl groups in a molecule; an organohydrogenpolysiloxane having at least two silicon-bonded hydrogen atoms in a molecule; a mixture of a solvent-soluble silicone resin that contains siloxane units expressed by the formulae: $(CH_3)_3SiO_{0.5}$ and $SiO_2$ and a solvent-soluble silicone resin that contains siloxane units as expressed by the formulae: $(CH_3)_3SiO_{0.5}$, $(CH_3)_2(CH_2=CH)SiO_{0.5}$, and $SiO_2$; and an addition reaction catalyst. Furthermore, Patent Document 3 proposes a releasable film-forming silicone composition containing: a silicone resin that substantially contains $SiO_2$ and $R'_3SiO_{1/2}$ units (where R' represent a monovalent hydrocarbon group having up to three carbon atoms, a hydrogen atom, an alkenyl group, or an oxyalkenyl group, at least one R' in a molecule represents the alkenyl group or oxyalkenyl group, and 50% or less of the $R'_3SiO_{1/2}$ units are an alkenyl group or oxyalkenyl group); an organopolysiloxane having at least three silicon atom-bonded hydrogen atoms in a molecule; and a hydrosilylation-reaction catalyst; where an organopolysiloxane having at least two alkenyl groups in a monovalent is added, if necessary.

However, with releasable films formed by the releasable film-forming silicone compositions described above, it is difficult to achieve sufficient high-strength peeling, and after a pressure sensitive adhesive is adhered for a long period of time, the release force changes or the residual pressure sensitive adhesive strength of the pressure sensitive adhesive decreases.

PRIOR ART DOCUMENTS

Patent Documents

Patent Document 1: Japanese Patent Application Publication No. S59-084953

Patent Document 2: Japanese Patent Application Publication No. H01-215857

Patent Document 3: Japanese Patent Application Publication No. H07-252360

BRIEF SUMMARY OF THE INVENTION

Technical Problem

An object of the present invention is to provide a release control agent for forming a releasable film with little change in release force and that does not reduce the residual adhesive strength of a pressure sensitive adhesive after long-term aging in a state adhered to the pressure sensitive adhesive despite exhibiting a relatively large release force with respect to the pressure sensitive adhesive. Furthermore, another object of the present invention is to provide a releasable film-forming silicone composition capable of forming a releasable film, as well as a release liner obtained by forming a releasable film using the composition.

Solution to Problem

A release control agent of the present invention contains:

(A) a silicone resin having a weight average molecular weight based on standard polystyrene by gel permeation chromatography of 3,000 to 6,000, and expressed by the average unit formula:

$$(R^1_3SiO_{1/2})_a(SiO_{4/2})_{1.0}$$

wherein each $R^1$ independently represents an alkyl group with 1 to 6 carbon atoms, and "a" represents a number from 0.5 to 1.5; and at least one of component (B) and component (C);

(B) a diorganopolysiloxane having at least two silicon-bonded alkenyl groups in a molecule, in an amount of 0 to 150 parts by mass relative to 100 parts by mass of component (A)

(C) an α-olefin with 12 to 24 carbon atoms, in an amount of 0 to 200 parts by mass relative to 100 parts by mass of component (A).

In the release control agent, component (A) is typically a silicone resin containing 2 to 5 mass % of hydroxyl groups bonded to silicon atoms.

Furthermore, in the release control agent, component (C) is typically an α-olefin with 12 to 18 carbon atoms.

Furthermore, the release control agent may further contain:

(D) a silicone resin expressed by the average unit formula:

$$(R^2_3SiO_{1/2})_b(SiO_{4/2})_{1.0}$$

wherein each $R^2$ independently represents an alkyl group with 1 to 6 carbon atoms or an alkenyl group with 2 to 6 carbon atoms, but at least one $R^2$ in a molecule is the alkenyl group, and "b" represents a number from 0.5 to 1.5, in an amount of at most 300 parts by mass relative to 100 parts by mass of component (A).

The releasable film-forming silicone composition of the present invention contains:

(I) the aforementioned release control agent;

(II) a diorganopolysiloxane having at least two silicon-bonded alkenyl groups in a molecule, in an amount of at most 400 parts by mass relative to a total of 100 parts by mass of components (A) to (C) in component (I);

(III) an organopolysiloxane having at least two silicon-bonded hydrogen atoms in a molecule, in an amount such that the amount of silicon-bonded hydrogen atoms in the present component is 0.5 to 10 mols relative to a total of 1 mol of alkenyl groups in the present composition; and (IV) a hydrosilylation-reaction catalyst.

The composition may further contain:

(V) a hydrosilylation reaction inhibitor in an amount of 0.001 to 5 mass % of the present composition.

The composition may further contain:

(VI) a silicone resin expressed by the average unit formula:

$$(R^2_3SiO_{1/2})_b(SiO_{4/2})_{1.0}$$

wherein each $R^2$ independently represents an alkyl group with 1 to 6 carbon atoms or an alkenyl group with 2 to 6 carbon atoms, but at least one $R^2$ in a molecule is the alkenyl group, and "b" represents a number from 0.5 to 1.5, in an amount of at most 50 parts by mass relative to a total of 100 parts by mass of components (A) to (C) in component (I).

A release liner of the present invention has a releasable film formed on a surface of a film or tape base material by the aforementioned releasable film-forming silicone composition.

Effects of Invention

By adding the release control agent of the present invention to a releasable film-forming silicone composition, it is possible to form a releasable film that has little change in release force and that does not reduce the residual adhesive strength of a pressure sensitive adhesive after long-term aging when adhered to the pressure sensitive adhesive, despite exhibiting a relatively large release force with respect to the pressure sensitive adhesive. Furthermore, the releasable film-forming silicone composition of the present invention can also form the releasable film as described above. Furthermore, the release liner of the present invention has the releasable film as described above, and therefore has the characteristics of little change in release force while not reducing the residual adhesive strength of a pressure sensitive adhesive after long-term aging when adhered to the pressure sensitive adhesive, despite exhibiting a relatively large release force with respect to the pressure sensitive adhesive.

DETAILED DESCRIPTION OF THE INVENTION

Definitions of Terms

Figure 1:
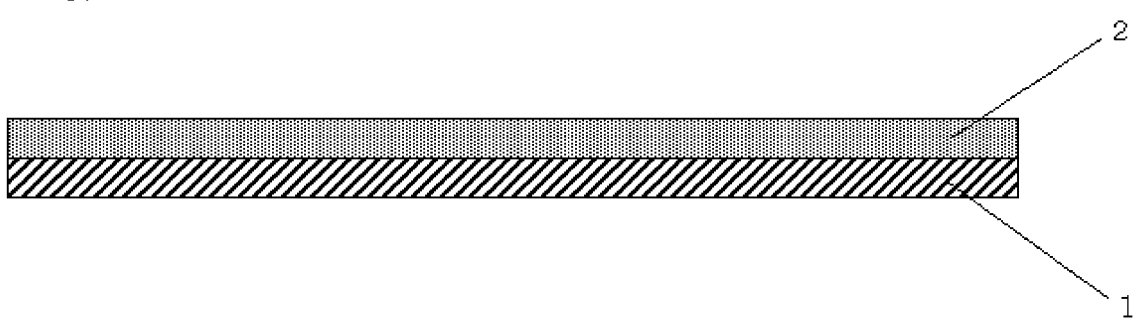
FIG. 1 is a cross-sectional view of the release liner of the present invention.

In the present specification, "weight average molecular weight" is a value in terms of standard polystyrene obtained by gel permeation chromatography. In the gel permeation chromatography measurement, a Waters Alliance e2695 Separations Module was used as a measurement device, a Tosoh TSK gel Multipore HXL-M (two columns) was used as a column, toluene was used as an eluate, and standard polystyrene was used as the standard polystyrene covering the molecular weight range of 590 to 6,770,000.

<Release Control Agent>

The release control agent of the present invention contains:

(A) a silicone resin expressed by the average unit formula:

$$(R^1_3SiO_{1/2})_a(SiO_{4/2})_{1.0}$$

and (B) an organopolysiloxane having at least two silicon atom-bonded hydrogen atoms in a molecule; or the aforementioned component (A) and (C) an α-olefin with 12 to 24 carbon atoms;

or the aforementioned components (A) to (C).

Component (A) is a base compound of the present release control agent and is a silicone resin expressed by the average unit formula above. In the formula, $R^1$ independently represents an alkyl group with 1 to 6 carbon atoms, and specific examples include methyl groups, ethyl groups, propyl groups, butyl groups, pentyl groups, and hexyl groups, among these, methyl groups are preferred.

Furthermore, in the formula, "a" represents a number within a range of 0.5 to 1.5, typically within a range of 0.6 to 1.2, or typically within a range of 0.6 to 1.0, which indicates the molar ratio of siloxane units expressed by formula: $R^1_3SiO_{1/2}$ to siloxane units expressed by formula: $SiO_{4/2}$. This is because when "a" is greater than or equal to the lower limit of the range described above, the coatability of the releasable film-forming silicone composition containing the component is improved, and when "a" is less than or equal to the upper limit of the range described above, the resulting releasable film can achieve high-strength peeling.

The weight average molecular weight of the silicone resins in terms of standard polystyrene by gel permeation chromatography is within a range of 3,000 to 6,000, typically within a range of 3,000 to 5,000, typically within a range of 4,000 to 6,000, or typically within a range of 4,000 to 5,000. This is because when the weight average molecular weight of the silicone resin is greater than or equal to the lower limit of the range described above, the resulting releasable film can achieve high-strength peeling, and when the weight average molecular weight is less than or equal to the upper limit of the range described above, the coatability of the releasable film-forming silicone composition containing the component is improved.

Furthermore, the silicone resin preferably has a hydroxyl group bonded to a silicon atom in a molecule, and the amount of hydroxyl groups bonded to silicon atoms is typically within a range of 2 to 5 mass %, typically within a range of 2 to 4 mass %, typically within a range of 2.5 to 4 mass %, or typically within a range of 2.5 to 3.5 mass %. This is because an amount of silicon-bonded hydroxyl groups in the silicone resin that is within the range above contributes to the curing reaction of the releasable film-forming silicone composition and can improve the residual adhesion ratio of the pressure sensitive adhesive when the resulting release liner is used.

Component (B) is a dispersing agent for component (A) and is a diorganopolysiloxane having at least two silicon-bonded alkenyl groups in a molecule. Examples of the alkenyl groups in component (B) include vinyl groups, allyl groups, butynyl groups, pentenyl groups, hexenyl groups, and other alkenyl groups with 2 to 6 carbon atoms, among these, vinyl groups and hexenyl groups are preferred. Furthermore, examples of groups bonded to silicon atoms other than the alkenyl groups in component (B) include: methyl groups, ethyl groups, propyl groups, butyl groups, pentyl groups, hexyl groups, and other alkyl groups with 1 to 6 carbon atoms; phenyl groups, tolyl groups, xylyl groups, and other aryl groups with 6 to 12 carbon atoms; and 3,3,3-trifluoropropyl groups and other halogen-substituted alkyl groups with 1 to 6 carbon atoms, among these, methyl groups are preferred. Furthermore, a small amount of a hydroxyl group, methoxy group, ethoxy group, or other alkoxy group with 1 to 3 carbon atoms may be bonded to the silicon atoms in component (B), within a scope that does not impair an object of the present invention.

A molecular structure of component (B) is not limited, and examples include straight-chain and partially branched straight-chain. Furthermore, a viscosity at 25° C. of component (B) is also not limited, and component (B) can have low viscosity or have high viscosity and be gum-like. However, since the dispersibility of the present release control agent is favorable, the viscosity is typically within a range of 10 to 1,000 mPa·s, or typically within a range of 10 to 500 mPa·s. Note that the viscosity at 25° C. of component (B) can be measured by a rotational viscometer in accordance with JIS K7117-1.

Examples of component (B) include a dimethylpolysiloxane blocked with dimethylvinylsiloxy groups at both molecular chain terminals; a copolymer of dimethylsiloxane and methylvinylsiloxane blocked with dimethylvinylsiloxy groups at both molecular chain terminals; a partially branched dimethylpolysiloxane blocked with dimethylvinylsiloxy groups at molecular chain terminals; a partially branched dimethylpolysiloxane blocked with dimethylvinylsiloxy groups at a portion of the molecular chain terminals and blocked with trimethylsiloxy groups at the other molecular chain terminals; a copolymer of dimethylsiloxane and methylvinylsiloxane blocked with trimethylsiloxy groups at both molecular chain terminals; a copolymer methylvinylsiloxane and methyl(3,3,3-trifluoropropyl)siloxane blocked with trimethylsiloxy groups at both molecular chain terminals; and a copolymer of dimethylsiloxane and methylvinylsiloxane blocked with silanol groups at both molecular chain terminals.

In the present release control agent, the inclusion of component (B) is optional, but in the absence of component (C) above, the inclusion of component (B) is essential. Note that in the present release control agent, the amount of component (B) is within a range of 0 to 150 parts by mass, and typically within a range of 10 to 150 parts by mass, or typically within a range of 20 to 100 parts by mass, each relative to 100 parts by mass of component (A). This is because when the amount of component (B) is greater than or equal to the lower limit of the range described above, the viscosity of the resulting release control agent can be reduced, making it easier to handle, and because the releasable film can be made to have stable high-strength peeling. On the other hand, if the amount is less than or equal to the upper limit of the range described above, the release force is stable, and a small amount of the release control agent can be blended to achieve high-strength peeling.

The present release control agent may contain the dispersing agent of component (A), or may contain component (A) and component (C) an α-olefin with 12 to 24 carbon atoms, in order to provide the releasable film with high-strength peeling. Examples of α-olefins include 1-tetradecene, 1-pentadecene, 1-hexadecene, 1-heptadecene, 1-octadecene, 1-nonadecene, and 1-eicosene, among these, α-olefins with 14 to 18 carbon atoms are preferred.

In the present release control agent, the inclusion of component (C) is optional, but in the absence of component (B) above, the inclusion of component (C) is essential. Note that component (C) is preferably included in order to promote high-strength peeling. The amount of component (C) is not limited, but in order to promote curing and high-strength peeling of the releasable film, the amount is typically at most 200 parts by mass, typically at most 180 parts by mass, typically at most 150 parts by mass, or typically at most 100 parts by mass, each relative to 100 parts by mass of component (A).

Furthermore, in order to adjust the release properties such as release force dependence on peeling rate, and to improve the mechanical strength of the releasable film, the present release control agent may further contain:

(D) a silicone resin expressed by average unit formula:

$$(R^2_3SiO_{1/2})_b(SiO_{4/2})_{1.0}$$

In the formula, each $R^2$ independently represents an alkyl group with 1 to 6 carbon atoms or an alkenyl group with 2 to 6 carbon atoms, but at least one $R^2$ in a molecule is the alkenyl group. Examples of the alkyl groups of $R^2$ are the same groups as in $R^1$ above, among these, methyl groups are preferred. Furthermore, examples of alkenyl groups of $R^2$ include vinyl groups, allyl groups, butenyl groups, pentenyl groups, and hexenyl groups, among these, vinyl groups and hexenyl groups are preferred.

Furthermore, in the formula, "b" represents a number within a range of 0.5 to 1.5, typically within a range of 0.6 to 1.2, or typically within a range of 0.6 to 1.0, which indicates the molar ratio of siloxane units expressed by formula: $R^2_3SiO_{1/2}$ to siloxane units expressed by formula: $SiO_{4/2}$. This is because when "b" is greater than or equal to the lower limit of the range described above, the dispersibility of the present release control agent is improved. On the other hand, when "b" is less than or equal to the upper limit of the range described above, the mechanical strength of the resulting releasable film is improved.

In the present release control agent, the amount of component (D) is not limited, but the amount is typically at most 300 parts by mass relative to 100 parts by mass of component (A), in order to not affect the releasability of the releasable film. This is because an increase in the amount of component (D) makes it become difficult to achieve high-strength peeling of the releasable film.

Furthermore, the present release control agent may also contain an organic solvent used in the preparation of component (A) or in blending component (A) with component (B), so long as an object of the present invention is not impaired. Examples of the organic solvents include hexane, heptane, octane, and other aliphatic solvents; toluene, xylene, and other aromatic solvents; and acetone and other ketone solvents. The amount of the organic solvent is not limited, and if included, the amount is typically at most 100 parts by mass relative to 100 parts by mass of component (A).

By blending the present release control agent into the releasable film-forming silicone composition, the release force of the resulting releasable film on the pressure sensitive adhesive can be controlled to achieve high-strength peeling. The curing mechanism of the releasable film forming silicone composition is not limited, and examples include hydrosilylation reactions, condensation reactions, radical reactions, radical reactions by high energy beam irradiation, condensation reactions by high energy beam irradiation, and hydrosilylation reactions by high energy beam irradiation, among these, hydrosilylation reactions are preferred.

<Releasable Film-Forming Silicone Composition>

The releasable film-forming silicone composition of the present invention contains:

(I) the aforementioned release control agent;

(II) a diorganopolysiloxane having at least two silicon atom-bonded alkenyl groups in a molecule;

(III) an organopolysiloxane having at least two silicon atom-bonded hydrogen atoms in a molecule; and (IV) a hydrosilylation-reaction catalyst.

Component (I) is a release control agent for adjusting the release force of the releasable film obtained by applying and curing the present composition on the surface of various base materials such as paper, synthetic resin film, and the like, as described above.

Component (II) is an optional component added when it is difficult to cure the present composition using only the alkenyl group-containing diorganopolysiloxane or alkenyl group-containing silicone resin in component (I) above, or to adjust the release force, and is a diorganopolysiloxane having at least two silicon-bonded alkenyl groups in a molecule. Examples of alkenyl groups in component (II) include the same alkenyl groups as in component (B) above, and vinyl groups and hexenyl groups are preferred. Furthermore, examples of groups bonded to silicon atoms other than alkenyl groups in component (II) include: alkyl groups similar to those in component (B) above; aryl groups; and halogen-substituted alkyl groups. Methyl groups are preferred. Furthermore, a small amount of a hydroxyl group, methoxy group, ethoxy group, or other alkoxy group with 1 to 3 carbon atoms may be bonded to the silicon atoms in component (II) within a scope that does not impair an object of the present invention.

A molecular structure of component (II) is not limited, and examples include straight chains and partially branched straight chains. Furthermore, a viscosity at 25° C. of component (II) is also not limited, and component (II) can have low viscosity or have high viscosity and be gum-like. However, since the coatability of the present composition is favorable and the releasability of the resulting cured film is excellent, the viscosity is typically within a range of 10 to 10,000 mPa·s, or typically within a range of 10 to 1,000 mPa·s. Note that the viscosity at 25° C. of component (II) can be measured by a rotational viscometer in accordance with JIS K7117-1.

Examples of component (II) include diorganopolysiloxanes similar to component (B) mentioned above.

In the present composition, the amount of component (II) is optional. If component (I) has enough alkenyl group-containing diorganopolysiloxane or alkenyl group-containing silicone resin to cure the present composition, component (II) does not need to be included. However, if this is not the case, or in order to adjust the release force or to impart flexibility or the like to the resulting releasable film, the amount of component (II) is at most 400 parts by mass, and typically at most 100 parts by mass, or typically at most 50 parts by mass, each relative to a total of 100 parts by mass of components (A) to (C) in component (I). This is because if the amount of component (II) is less than or equal to the upper limit above, the resulting releasable film can be sufficiently cured to achieve high-strength peeling.

Component (III) is a crosslinking agent of the present composition and is an organopolysiloxane having at least two silicon-bonded hydrogen atoms in a molecule. Examples of groups bonded to silicon atoms other than hydrogen atoms in component (III) include: methyl groups, ethyl groups, propyl groups, butyl groups, pentyl groups, hexyl groups, and other alkyl groups with 1 to 6 carbon atoms; phenyl groups, tolyl groups, xylyl groups, and other aryl groups with 6 to 12 carbon atoms; and 3,3,3-trifluoropropyl groups and other halogen-substituted alkyl groups with 1 to 6 carbon atoms, among these, methyl groups are preferred. Furthermore, a small amount of a hydroxyl group, methoxy group, ethoxy group, or other alkoxy group with 1 to 3 carbon atoms may be bonded to the silicon atoms in component (III) within a scope that does not impair an object of the present invention.

A molecular structure of component (III) is not limited, and examples include straight-chain, branched-chain, partially branched straight-chain, resinous, and cyclic structures, but is typically straight-chain, partially branched straight-chain, or resinous. Furthermore, a viscosity at 25° C. of component (III) is also not limited, but is typically within a range of 1 to 1,000 mPa·s, or typically within a range of 5 to 200 mPa·s. Note that the viscosity at 25° C. of component (III) can be measured by a rotational viscometer in accordance with JIS K7117-1.

Examples of component (III) include: a methylhydrogenpolysiloxane blocked with trimethylsiloxy groups at both molecular chain terminals; a copolymer of methylhydrogensiloxane and dimethylsiloxane blocked with trimethylsiloxy groups at both molecular chain terminals; a copolymer of dimethylsiloxane and methylhydrogensiloxane blocked with dimethylhydrogensiloxy groups at both molecular chain terminals; a dimethylpolysiloxane blocked with dimethylhydrogensiloxy groups at both molecular chain terminals; a copolymer containing siloxane units expressed by the formula: $H(CH_3)_2SiO_{1/2}$ and siloxane units expressed by the formula: $SiO_{4/2}$; and a copolymer containing siloxane units expressed by the formula: $(CH_3)_3SiO_{1/2}$, siloxane units expressed by the formula: $H(CH_3)_2SiO_{1/2}$, and siloxane units expressed by the formula: $SiO_{4/2}$.

In the present composition, the amount of component (III) is not limited, but the amount of silicon atom-bonded hydrogen atoms in the present component is within a range of 0.5 to 10 mols, and typically within a range of 1.0 to 5.0 mols, or typically within a range of 1.5 to 4.0 mols, each relative to a total of 1 mol of alkenyl groups in the present composition. This is because if the amount of component (III) is greater than or equal to the lower limit of the range described above, the resulting releasable film can be sufficiently cured. On the other hand, if the amount is less than or equal to the upper limit of the range described above, the release force of the resulting releasable film is less likely to change.

Component (IV) is a hydrosilylation-reaction catalyst for promoting curing of the present composition, and examples include platinum-based catalysts, rhodium-based catalysts, and palladium-based catalysts. In particular, component (IV) is typically a platinum-based catalyst, as it can significantly promote the curing of the present composition. Examples of the platinum-based catalyst include platinum fine powder, chloroplatinic acid, an alcohol solution of chloroplatinic acid, a platinum-alkenyl siloxane complex, a platinum-olefin complex, and a platinum-carbonyl complex, with a platinum-alkenyl siloxane complex particularly preferable. Examples of alkenylsiloxanes in the platinum-alkenylsiloxane complexes include: 1,3-divinyl-1,1,3,3-tetramethyldisiloxane; 1,3,5,7-tetramethyl-1,3,5,7-tetravinylcyclotetrasiloxane; alkenyl siloxanes in which a portion of methyl groups of the alkenylsiloxanes is substituted with an ethyl group, a phenyl group, or the like; and alkenylsiloxanes in which a portion of vinyl groups of the alkenylsiloxanes is substituted with an allyl group, a hexenyl group, or the like. In particular, 1,3-divinyl-1,1,3,3-tetramethyldisiloxane is preferable because the platinum-alkenyl siloxane complex has good stability.

In the present composition, the amount of component (IV) is not particularly limited so long as the amount promotes curing of the present composition, but is typically an amount in which catalyst metal atoms in component (IV) are within a range of 0.01 to 1,000 ppm, 0.01 to 500 ppm, or 0.1 to 500 ppm by mass relative to a total of components (II) to (IV) and a total of components (A) to (D) in the present composition.

In order to adjust the curability of the present composition or improve the pot life of the present composition at room temperature, the present composition typically contains a small amount of (V) a hydrosilylation reaction inhibitor such as: 2-methyl-3-butyn-2-ol, 3,5-dimethyl-1-hexyn-3-ol, 2-phenyl-3-butyn-2-ol, 1-ethynylcyclohexan-1-ol, and other alkyne alcohols; (1,1-dimethyl-2-propynyloxy)trimethylsilane, bis(1,1-dimethyl-2-propynyloxy)dimethylsilane, bis(1,1-dimethyl-2-propynyloxy)methylvinylsilane, tris(1,1-dimethyl-2-propynyloxy)methylsilane, tris(1-methyl-1-phenyl-2-propynyloxy)methylsilane, tetrakis(1,1-dimethyl-2-propynyloxy)silane, (1-ethynyl-cyclohexyloxy)dimethylvinylsilane, and other silylated alkyne alcohols; 3-methyl-3-penten-1-yne, 3,5-dimethyl-3-hexen-1-yne, and other enyne compounds; 1,3,5,7-tetramethyl-1,3,5,7-tetravinylcyclotetrasiloxane, 1,3,5,7-tetramethyl-1,3,5,7-tetrahexenylcyclotetrasiloxane, and other cycloalkenylsiloxanes; benzotriazole and other triazole compounds; and the like. The amount of component (V) is not limited, but is typically within a range of 0.001 to 5 mass % of the present composition.

Furthermore, the present composition may further contain (VI) a silicone resin expressed by the average unit formula:

$$(R^2_3SiO_{1/2})_b(SiO_{4/2})_{1.0}$$

within a scope that does not impair an object of the present invention.

In the formula, each $R^2$ independently represents an alkyl group with 1 to 6 carbon atoms or an alkenyl group with 2 to 6 carbon atoms, but at least one $R^2$ in a molecule is an alkenyl group. Examples of the alkyl groups of $R^2$ are the same groups as in $R^1$ above, among these, methyl groups are preferred. Furthermore, examples of alkenyl groups of $R^2$ include vinyl groups, allyl groups, butenyl groups, pentenyl groups, and hexenyl groups, among these, vinyl groups and hexenyl groups are preferred.

Furthermore, in the formula, "b" represents a number within a range of 0.5 to 1.5, typically within a range of 0.6 to 1.2, or typically within a range of 0.6 to 1.0, which indicates the molar ratio of siloxane units expressed by formula: $R^2_3SiO_{1/2}$ to siloxane units expressed by formula: $SiO_{4/2}$. This is because when "b" is greater than or equal to the lower limit of the range described above, the coatability of the present composition is improved. On the other hand, when "b" is less than or equal to the upper limit of the range described above, the mechanical strength of the resulting releasable film is improved.

In the present composition, the amount of component (VI) is not particularly limited, but is typically at most 80 parts by mass relative to a total of 100 parts by mass of components (A) to (C) in component (I). This is because when the amount of component (VI) is less than or equal to the upper limit of the range described above, the releasability of the resulting releasable film is not affected.

Furthermore, the present composition may also contain an organic solvent to improve coating work of the present composition and to adjust the coating amount on the base material surface, so long as an object of the present invention is not impaired. Examples of the organic solvents include hexane, heptane, octane, and other aliphatic solvents; toluene, xylene, and other aromatic solvents; and acetone and other ketone solvents. The amount of the organic solvent is not limited and can be adjusted in accordance with the coating amount and the like.

<Release Liner>

The release liner of the present invention has, as illustrated in FIG. 1 for example, a releasable film 2 formed on a surface of a film or tape base material 1 by the aforementioned releasable film-forming silicone composition. Examples of the base material 1 include: papers such as Japanese paper, paperboard, corrugated paper, glassine paper, clay-coated paper, polyolefin-laminated paper, polyethylene-laminated paper, synthetic paper, and other papers; polyimide, polyethylene, polypropylene, polystyrene, polyvinyl chloride, polycarbonate, polyethylene terephthalate, nylon, and other plastic films; natural fiber fabrics, synthetic fiber fabrics, artificial leather fabrics, and other fabrics; and glass wool and metal foils.

As a method of preparing the release liner of the present invention, the releasable film-forming silicone composition can be coated on the surface of the base material using, for example, gravure coating, bar coating, spray coating, spin coating, knife coating, roll coating, or die coating, and then cured at room temperature or by heating to form the releasable film. Furthermore, in the release liner of the present invention, the coating amount (after drying and curing) of the releasable film formed on the base material surface is not limited, but is typically within a range of 0.01 to 10 g/m² or typically within a range of 0.1 to 5 g/m².

Figure 2:
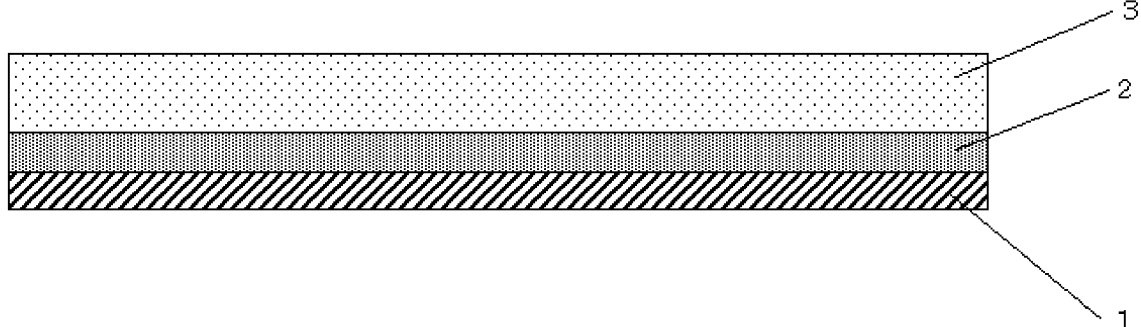
FIG. 2 is a cross-sectional view illustrating a condition in which a pressure sensitive adhesive is laminated to the release liner of the present invention.

The release liner of the present invention may, for example, have a pressure sensitive adhesive 3 further formed on the releasable film 2 formed on the surface of the base material 1, as illustrated in FIG. 2. Examples of these pressure sensitive adhesives 3 include silicone pressure sensitive adhesives and acrylic pressure sensitive adhesives.

EXAMPLES

The release control agent, releasable film-forming silicone composition, and release liner of the present invention will be described in detail using examples. Note that a method of preparing the release liner and measurement of the release force and the residual adhesion ratio of the pressure sensitive adhesive were performed as follows.

<Preparation Method of Release Liner>

A releasable film-forming silicone composition was diluted with heptane to adjust viscosity, and the total of components (A) to (D) and components (II) to (VI) in the composition was 10 mass %. The solution was applied to the surface of a polyethylene laminated Kraft paper at an amount of 0.6 to 0.8 g/m² after drying and curing using a Myer bar #5, and cured in a hot air dryer at 120° C. for 30 seconds to prepare a release liner.

<Release Force Measurement>

After the release liner prepared by the method above was treated in a dryer at 70° C. for 3 days, a pressure sensitive adhesive tape (Tesa 7475 tape; product name manufactured by Tesa Tape, Inc.) with a width of 25 mm was adhered, and the release liner was cut into strips with a width of 30 mm around the pressure sensitive adhesive tape to prepare test bodies. A portion of the test body was treated at 23° C. for one day with a load of 20 g/cm², the load was stopped, the test body was left for 30 minutes, and then the release force (gf/25 mm) was measured by peeling off the Tesa 7475 tape at an angle of 180° and a peeling rate of 0.3 m/min using a tensile test machine. Furthermore, the remainder of the test body was treated in a dryer at 70° C. for one day under a load of 20 g/cm², the load was stopped, the test body was allowed to cool for 30 minutes, and then the release force was measured in the same manner as above.

<Residual Adhesion Ratio>

After the release liner prepared by the method above was treated in a dryer at 70° C. for 3 days, a pressure sensitive adhesive tape (Polyester pressure sensitive adhesive tape 31B; product name manufactured by Nitto Denko Corporation) with a width of 38 mm was adhered, and the release liner was cut into strips with a width of 45 mm around the pressure sensitive adhesive tape to prepare test bodies. Furthermore, the same test body was also prepared using the pressure sensitive adhesive tape as a reference and a Teflon (registered trademark) sheet as a release liner. These test bodies were treated in a dryer at 70° C. for one day with a load of 27 g/cm² and then air cooled for approximately 30 minutes. Thereafter, the pressure sensitive adhesive tape was then adhered to a 200 μm thick polyethylene terephthalate film, and after two round trips of crimping with a 2 kg tape roller, the pressure sensitive adhesive tape was peeled off at an angle of 180° and a peeling rate of 0.3 m/min using a tensile test machine to measure the release force (gf/38 mm). The residual adhesion ratio was defined as the ratio (%) of the pressure sensitive adhesive strength when the release liner prepared in the examples was used with respect to the pressure sensitive adhesive strength when a Teflon (registered trademark) sheet was used as the release liner.

Examples 1 to 19 and Comparative Examples 1 to 6

The following components were uniformly mixed to obtain the compositions shown in Tables 1 to 5 to prepare release control agents and releasable film-forming silicone compositions containing the release control agents. The amount of the hydrosilylation-reaction catalyst in the releasable film-forming silicone composition was determined to be an amount of 100 ppm platinum metal by mass relative to a total of components (A) to (D) and components (II) to (VI) in the composition.

The following components were used as the silicone resin for component (A).

(a-1): Silicone resin expressed by the average unit formula:

$$[(CH_3)_3SiO_{1/2}]_{0.75}(SiO_{4/2})_{1.0}$$

and having the weight average molecular weight of 4490 in terms of standard polystyrene by gel permeation chromatography (amount of silicon-bonded hydroxyl groups=3.0 mass %)

(a-2): Silicone resin expressed by the average unit formula:

$$[(CH_3)_3SiO_{1/2}]_{0.74}(SiO_{4/2})_{1.0}$$

and having the weight average molecular weight of 4900 in terms of standard polystyrene by gel permeation chromatography (amount of silicon-bonded hydroxyl groups=3.0 mass %)

(a-3): Silicone resin expressed by the average unit formula:

$$[(CH_3)_3SiO_{1/2}]_{0.97}(SiO_{4/2})_{1.0}$$

and having the weight average molecular weight of 2240 in terms of standard polystyrene by gel permeation chromatography (amount of silicon-bonded hydroxyl groups=2.8 mass %)

(a-4): Silicone resin expressed by the average unit formula:

$$[(CH_3)_3SiO_{1/2}]_{0.92}(SiO_{4/2})_{1.0}$$

and having the weight average molecular weight of 6860 in terms of standard polystyrene by gel permeation chromatography (amount of silicon-bonded hydroxyl groups=1.0 mass %)

The following components were used as the diorganopolysiloxane for component (B).

(b-1): Dimethylpolysiloxane blocked with dimethylvinylsiloxy groups at both molecular chain terminals and having a viscosity of 60 mPa·s (amount of vinyl groups=1.5 mass %)

(b-2): Copolymer of dimethylsiloxane and methylhexenylsiloxane blocked with dimethylvinylsiloxy groups at both molecular chain terminals and having a viscosity of 200 mPa·s (amount of vinyl groups=1.1 mass %)

The following components were used as the α-olefin for component (C).

(c-1): 1-hexadecene (c-2): 1-tetradecene (c-3): 1-octadecene

The following component was used as component (D).

(d-1): Silicone resin expressed by the average unit formula:

$$[(CH_2{=}CH)(CH_3)_2SiO_{1/2}]_{0.05}[(CH_3)_3SiO_{1/2}]_{0.43}(SiO_{4/2})_{0.52}$$

(amount of vinyl groups=2.0 mass %)

The following component was used as the organic solvent (E).

(e-1): Xylene

The following components were used as component (II).

(ii-1): Dimethylpolysiloxane blocked with dimethylvinylsiloxy groups at both molecular chain terminals and having a viscosity of 60 mPa·s (amount of vinyl groups: 1.5 mass %)

(ii-2): Copolymer of dimethylsiloxane and methylhexenylsiloxane blocked with dimethylvinylsiloxy groups at both molecular chain terminals and having a viscosity of 200 mPa·s (amount of vinyl groups=1.1 mass %)

The following components were used as component (III).

(iii-1): Methylhydrogenpolysiloxane blocked with trimethylsiloxy groups at both molecular chain terminals ad having a viscosity of 20 mPa·s (amount of silicon atom-bonded hydrogen atoms=1.6 mass %)

(iii-2): Copolymer of methylhydrogensiloxane and dimethylsiloxane blocked with trimethylsiloxy groups at both molecular chain terminals and having a viscosity of 70 mPa·s (amount of silicon atom-bonded hydrogen atoms=1.0 mass %)

The following component was used as component (IV).

(iv-1): 1,3-divinyltetramethyldisiloxane solution of a 1,3-divinyltetramethyldisiloxane complex of platinum, having a platinum concentration of 0.6 mass %

The following components were used as component (V).

(v-1): 1-ethynyl-cyclohexan-1-ol (v-2): 2-methyl-3-butyn-2-ol

The following component was used as component (VI).

(vi-1): Silicone resin expressed by the average unit formula:

$$[(CH_2{=}CH)(CH_3)_2SiO_{1/2}]_{0.05}[(CH_3)_3SiO_{1/2}]_{0.43}(SiO_{4/2})_{0.52}$$

(amount of vinyl groups=2.0 mass %)

The following component was used as the organic solvent (VII).

(vii-1): Heptane

TABLE 1

|  |  |  |  | Present Invention | | Comparative Examples | | | |
|---|---|---|---|---|---|---|---|---|---|
|  |  |  |  | Exam. 1 | Exam. 2 | Comp. Exam. 1 | Comp. Exam. 2 | Comp. Exam. 3 | Comp. Exam. 4 |
| Composition of releasable film-forming silicone composition (parts by mass) | (I) Composition of release control agent (parts by mass) | (A) | (a-1) | 38.0 | 38.0 | 0 | 0 | 0 | 0 |
|  |  |  | (a-2) | 0 | 0 | 0 | 0 | 0 | 0 |
|  |  |  | (a-3) | 0 | 0 | 38.0 | 0 | 38.0 | 0 |
|  |  |  | (a-4) | 0 | 0 | 0 | 38.0 | 0 | 38.0 |
|  |  | (B) | (b-1) | 10.0 | 0 | 10.0 | 10.0 | 0 | 0 |
|  |  |  | (b-2) | 0 | 10.0 | 0 | 0 | 10.0 | 10.0 |
|  |  | (C) | (c-1) | 12.0 | 12.0 | 12.0 | 12.0 | 12.0 | 12.0 |
|  |  |  | (c-2) | 0 | 0 | 0 | 0 | 0 | 0 |
|  |  |  | (c-3) | 0 | 0 | 0 | 0 | 0 | 0 |
|  |  | (D) | (d-1) | 0 | 0 | 0 | 0 | 0 | 0 |
|  |  | (E) | (e-1) | 14.8 | 14.8 | 17.4 | 21.9 | 17.4 | 21.9 |
|  | (II) |  | (ii-1) | 29.0 | 0 | 29.0 | 29.0 | 0 | 0 |
|  |  |  | (ii-2) | 0 | 29.7 | 0 | 0 | 29.7 | 29.7 |
|  | (III) |  | (iii-1) | 10.7 | 10.0 | 10.7 | 10.7 | 10.0 | 10.0 |
|  |  |  | (iii-2) | 0 | 0 | 0 | 0 | 0 | 0 |
|  | (IV) |  | (iv-1)* | 100 ppm | | | | | |
|  | V |  | (v-1) | 0.3 | 0.3 | 0.3 | 0.3 | 0.3 | 0.3 |
|  |  |  | (v-2) | 0 | 0 | 0 | 0 | 0 | 0 |
|  | (VI) |  | (vi-1) | 0 | 0 | 0 | 0 | 0 | 0 |
|  | (VII) |  | (vii-1) | 885 | 885 | 883 | 878 | 883 | 878 |
| Release force (g/25 mm) | 23° C., after 1 day | | | 750 | 630 | 290 | 510 | 290 | 520 |
|  | 70° C., after 1 day | | | 880 | 710 | 470 | 510 | 540 | 460 |
| Residual adhesion ratio (%) | | | | 100 | 100 | 100 | 87 | 100 | 83 |

TABLE 2

|  |  |  |  | Present Invention | | | | |
|---|---|---|---|---|---|---|---|---|
|  |  |  |  | Example 3 | Example 4 | Example 5 | Example 6 | Example 7 |
| Composition of releasable film-forming silicone composition (parts by mass) | (I) Composition of release control agent (parts by mass) | (A) | (a-1) | 37.0 | 37.0 | 37.0 | 37.0 | 37.0 |
|  |  |  | (a-2) | 0 | 0 | 0 | 0 | 0 |
|  |  |  | (a-3) | 0 | 0 | 0 | 0 | 0 |
|  |  |  | (a-4) | 0 | 0 | 0 | 0 | 0 |
|  |  | (B) | (b-1) | 10.0 | 10.0 | 10.0 | 10.0 | 40.0 |
|  |  |  | (b-2) | 0 | 0 | 0 | 0 | 0 |
|  |  | (C) | (c-1) | 15.0 | 11.3 | 7.5 | 3.8 | 0 |
|  |  |  | (c-2) | 0 | 0 | 0 | 0 | 0 |
|  |  |  | (c-3) | 0 | 0 | 0 | 0 | 0 |
|  |  | (D) | (d-1) | 0 | 0 | 0 | 0 | 0 |
|  |  | (E) | (e-1) | 14.4 | 14.4 | 14.4 | 14.4 | 14.4 |
|  | (II) |  | (ii-1) | 16.3 | 23.2 | 30.1 | 37.0 | 13.9 |
|  |  |  | (ii-2) | 0 | 0 | 0 | 0 | 0 |
|  | (III) |  | (iii-1) | 7.2 | 6.1 | 5.1 | 4.1 | 3.0 |
|  |  |  | (iii-2) | 14.4 | 12.3 | 10.2 | 8.1 | 6.0 |
|  | (IV) |  | (iv-1)* | 100 ppm | | | | |
|  | V |  | (v-1) | 0.2 | 0.2 | 0.2 | 0.2 | 0.2 |
|  |  |  | (v-2) | 0 | 0 | 0 | 0 | 0 |
|  | (VI) |  | (vi-1) | 0 | 0 | 0 | 0 | 0 |
|  | (VII) |  | (vii-1) | 886 | 886 | 886 | 886 | 886 |
| Release force (g/25 mm) | 23° C., after 1 day | | | 1230 | 1100 | 860 | 670 | 580 |
|  | 70° C., after 1 day | | | 1360 | 1220 | 990 | 780 | 670 |
| Residual adhesion ratio (%) | | | | 100 | 100 | 100 | 100 | 100 |

TABLE 3

| | | | | | Present Invention | | | | | Comp. Examples |
|---|---|---|---|---|---|---|---|---|---|---|
| | | | | Exam. 8 | Exam. 9 | Exam. 10 | Exam. 11 | Exam. 12 | Comp. Exam. 5 |
| Composition of releasable film-forming silicone composition (parts by mass) | (I) Composition of release control agent (parts by mass) | (A) | (a-1) | 35.0 | 29.8 | 26.3 | 17.5 | 8.8 | 0 |
| | | | (a-2) | 0 | 0 | 0 | 0 | 0 | 0 |
| | | | (a-3) | 0 | 0 | 0 | 0 | 0 | 0 |
| | | | (a-4) | 0 | 0 | 0 | 0 | 0 | 0 |
| | | (B) | (b-1) | 10.0 | 10.0 | 10.0 | 10.0 | 10.0 | 10.0 |
| | | | (b-2) | 0 | 0 | 0 | 0 | 0 | 0 |
| | | (C) | (c-1) | 15.0 | 15.0 | 15.0 | 15.0 | 15.0 | 15.0 |
| | | | (c-2) | 0 | 0 | 0 | 0 | 0 | 0 |
| | | | (c-3) | 0 | 0 | 0 | 0 | 0 | 0 |
| | | (D) | (d-1) | 0 | 5.3 | 8.8 | 17.5 | 26.3 | 35.0 |
| | | (E) | (e-1) | 13.6 | 13.5 | 13.5 | 13.4 | 13.3 | 13.1 |
| | (II) | | (ii-1) | 14.9 | 14.9 | 14.9 | 14.9 | 14.9 | 14.9 |
| | | | (ii-2) | 0 | 0 | 0 | 0 | 0 | 0 |
| | (III) | | (iii-1) | 8.3 | 8.3 | 8.3 | 8.3 | 8.3 | 8.3 |
| | | | (iii-2) | 16.7 | 16.7 | 16.7 | 16.7 | 16.7 | 16.7 |
| | (IV) | | (iv-1)* | 100 ppm | | | | | |
| | V | | (v-1) | 0.2 | 0.2 | 0.2 | 0.2 | 0.2 | 0.2 |
| | | | (v-2) | 0 | 0 | 0 | 0 | 0 | 0 |
| | (VI) | | (vi-1) | 0 | 0 | 0 | 0 | 0 | 0 |
| | (VII) | | (vii-1) | 886 | 886 | 886 | 887 | 887 | 887 |
| Release force (g/25 mm) | 23° C., after 1 day | | | 1230 | 1250 | 1200 | 1110 | 970 | 550 |
| | 70° C., after 1 day | | | 1400 | 1350 | 1300 | 1230 | 1080 | 680 |
| Residual adhesion ratio (%) | | | | 100 | 100 | 98 | 98 | 100 | 100 |

TABLE 4

| | | | | | Present Invention | | | | Comp. Examples |
|---|---|---|---|---|---|---|---|---|---|
| | | | | Exam. 13 | Exam. 14 | Exam. 15 | Exam. 16 | Comp. Exam. 6 |
| Composition of releasable film-forming silicone composition (parts by mass) | (I) Composition of release control agent (parts by mass) | (A) | (a-1) | 0 | 0 | 0 | 0 | 0 |
| | | | (a-2) | 35.0 | 29.8 | 26.3 | 17.5 | 0 |
| | | | (a-3) | 0 | 0 | 0 | 0 | 0 |
| | | | (a-4) | 0 | 0 | 0 | 0 | 0 |
| | | (B) | (b-1) | 10.0 | 10.0 | 10.0 | 10.0 | 0 |
| | | | (b-2) | 0 | 0 | 0 | 0 | 0 |
| | | (C) | (c-1) | 15.0 | 15.0 | 15.0 | 15.0 | 15.0 |
| | | | (c-2) | 0 | 0 | 0 | 0 | 0 |
| | | | (c-3) | 0 | 0 | 0 | 0 | 0 |
| | | (D) | (d-1) | 0 | 0 | 0 | 0 | 0 |
| | | (E) | (e-1) | 0 | 0 | 0 | 0 | 0 |
| | (II) | | (ii-1) | 16.9 | 16.9 | 16.9 | 16.9 | 26.9 |
| | | | (ii-2) | 0 | 0 | 0 | 0 | 0 |
| | (III) | | (iii-1) | 5.5 | 5.5 | 5.5 | 5.5 | 5.5 |
| | | | (iii-2) | 17.5 | 17.5 | 17.5 | 17.5 | 17.5 |
| | (IV) | | (iv-1)* | 100 ppm | | | | |
| | V | | (v-1) | 0.2 | 0.2 | 0.2 | 0.2 | 0.2 |
| | | | (v-2) | 0 | 0 | 0 | 0 | 0 |
| | (VI) | | (vi-1) | 0 | 5.3 | 8.8 | 17.5 | 35.0 |
| | (VII) | | (vii-1) | 900 | 900 | 900 | 900 | 900 |
| Release force (g/25 mm) | 23° C., after 1 day | | | 1070 | 1000 | 1000 | 700 | 470 |
| | 70° C., after 1 day | | | 1410 | 1400 | 1400 | 1330 | 650 |
| Residual adhesion ratio (%) | | | | 100 | 100 | 99 | 100 | 100 |

TABLE 5

| | | | | Present Invention | | |
|---|---|---|---|---|---|---|
| | | | | Example 17 | Example 18 | Example 19 |
| Composition of releasable film-forming silicone composition (parts by mass) | (I) Composition of release control agent (parts by mass) | (A) | (a-1) | 36.0 | 36.0 | 36.0 |
| | | | (a-2) | 0 | 0 | 0 |
| | | | (a-3) | 0 | 0 | 0 |
| | | | (a-4) | 0 | 0 | 0 |
| | | (B) | (b-1) | 10.0 | 10.0 | 10.0 |
| | | | (b-2) | 0 | 0 | 0 |
| | | (C) | (c-1) | 12.0 | 0 | 0 |
| | | | (c-2) | 0 | 12.0 | 0 |
| | | | (c-3) | 0 | 0 | 12.0 |
| | | (D) | (d-1) | 0 | 0 | 0 |
| | | (E) | (e-1) | 14.0 | 14.0 | 14.0 |
| | (II) | | (ii-1) | 23.8 | 22.3 | 25.3 |
| | | | (ii-2) | 0 | 0 | 0 |
| | (III) | | (iii-1) | 6.0 | 6.5 | 5.5 |
| | | | (iii-2) | 12.0 | 13.0 | 11.0 |
| | (IV) | | (iv-1)* | | 100 ppm | |
| | V | | (v-1) | 0 | 0 | 0 |
| | | | (v-2) | 0.2 | 0.2 | 0.2 |
| | (VI) | | (vi-1) | 0 | 0 | 0 |
| | (VII) | | (vii-1) | 886 | 886 | 886 |
| Release force (g/25 mm) | | 23° C., after 1 day | | 820 | 860 | 750 |
| | | 70° C., after 1 day | | 980 | 1050 | 940 |
| Residual adhesion ratio (%) | | | | 100 | 100 | 100 |

Industrial Applicability

The releasable film-forming silicone composition containing the release control agent of the present invention can form a releasable film that has little change in release force and that does not reduce the residual adhesive strength of a pressure sensitive adhesive after long-term aging in a state adhered to the pressure sensitive adhesive despite exhibiting a relatively large release force with respect to the pressure sensitive adhesive. Therefore, the composition is suitable for applications such as pressure sensitive adhesive labels, pressure sensitive adhesive seals, pressure sensitive adhesive tapes, process papers, optical pressure sensitive adhesive films, and the like that require long-term control of release performance.

DESCRIPTION OF THE REFERENCE NUMERALS

1: Base Material
2: Releasable Film
3: Pressure Sensitive Adhesive

The invention claimed is:

1. A release control agent comprising:

(A) a silicone resin having a weight average molecular weight based on standard polystyrene by gel permeation chromatography of 3,000 to 6,000 and expressed by the average unit formula:

$$(R^1{}_3SiO_{1/2})_a(SiO_{4/2})_{1.0}$$

wherein each $R^1$ independently represents an alkyl group with 1 to 6 carbon atoms, and "a" represents a number from 0.5 to 1.5;

(B) a diorganopolysiloxane having at least two silicon-bonded alkenyl groups in a molecule, in an amount up to 150 parts by mass relative to 100 parts by mass of component (A); and (C) a linear α-olefin with 12 to 24 carbon atoms, in an amount up to 200 parts by mass relative to 100 parts by mass of component (A).

2. The release control agent according to claim 1, wherein component (A) is a silicone resin containing 2 to 5 mass % of hydroxyl groups bonded to silicon atoms.

3. The release control agent according to claim 1, wherein component (C) is a linear α-olefin with 14 to 18 carbon atoms.

4. The release control agent according to claim 1, further comprising:

(D) a silicone resin expressed by the average unit formula:

$$(R^2{}_3SiO_{1/2})_b(SiO_{4/2})_{1.0}$$

wherein each $R^2$ independently represents an alkyl group with 1 to 6 carbon atoms or an alkenyl group with 2 to 6 carbon atoms, but at least one $R^2$ in a molecule is an alkenyl group, and "b" represents a number from 0.5 to 1.5, in an amount of at most 300 parts by mass relative to 100 parts by mass of component (A).

5. A releasable film-forming silicone composition, comprising:

(I) the release control agent according to claim 1;

(II) a diorganopolysiloxane having at least two silicon-bonded alkenyl groups in a molecule, in an amount of at most 400 parts by mass relative to a total of 100 parts by mass of components (A) to (C) in component (I);

(III) an organopolysiloxane having at least two silicon-bonded hydrogen atoms in a molecule, in an amount such that the amount of silicon-bonded hydrogen atoms in the present component is 0.5 to 10 mols relative to a total of 1 mol of alkenyl groups in the releasable film-forming silicone composition; and (IV) a hydrosilylation-reaction catalyst.

6. The releasable film-forming silicone composition according to claim 5, further comprising:

(V) a hydrosilylation reaction inhibitor in an amount of 0.001 to 5 mass % of the releasable film-forming silicone composition.

7. The releasable film-forming silicone composition according to claim 5, further comprising:

(VI) a silicone resin expressed by the average unit formula:

$$(R^2{}_3SiO_{1/2})_b(SiO_{4/2})_{1.0}$$

wherein each $R^2$ independently represents an alkyl group with 1 to 6 carbon atoms or an alkenyl group with 2 to 6 carbon atoms, but at least one $R^2$ in a molecule is the alkenyl group, and "b" represents a number from 0.5 to 1.5, in an amount of at most 50 parts by mass relative to a total of 100 parts by mass of components (A) to (C) in component (I).

8. A release liner, wherein a releasable film is formed on a surface of a film or tape base material by the releasable film-forming silicone composition according to claim 5.

9. The release control agent according to claim 1, wherein component (A) has a weight average molecular weight of 4,000 to 5,000.

10. The release control agent according to claim 1, wherein component (C) is selected from the group consisting of 1-tetradecene, 1-pentadecene, 1-hexadecene, 1-heptadecene, 1-octadecene, 1-nonadecene, and 1-eicosene.

11. The release control agent according to claim 4, further comprising:

(E) an organic solvent, in an amount of at most 100 parts by mass relative to 100 parts by mass of component (A).

* * * * *